United States Patent
Farris et al.

(10) Patent No.: US 12,173,615 B2
(45) Date of Patent: Dec. 24, 2024

(54) MULTI-ZONE BLADE FABRICATION

(71) Applicant: Raytheon Technologies Corporation, Farmington, CT (US)

(72) Inventors: John R. Farris, Lebanon, CT (US); John A. Sharon, West Hartford, CT (US); Alan D. Cetel, West Hartford, CT (US); Dilip M. Shah, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 13 days.

(21) Appl. No.: 17/174,938

(22) Filed: Feb. 12, 2021

(65) Prior Publication Data

US 2021/0254474 A1     Aug. 19, 2021

Related U.S. Application Data

(60) Provisional application No. 62/976,561, filed on Feb. 14, 2020.

(51) Int. Cl.
*F01D 5/14*     (2006.01)
*B22D 19/16*    (2006.01)
(Continued)

(52) U.S. Cl.
CPC ............. *F01D 5/147* (2013.01); *B22D 19/16* (2013.01); *B22D 21/00* (2013.01); *B23K 11/002* (2013.01);
(Continued)

(58) Field of Classification Search
CPC .... B23K 9/0956; B23K 11/02; B23K 13/015; B23K 2101/001; B23K 11/002; F05D 2230/232; F05D 2230/21–211; B22D 19/16; B22D 21/00; B23P 15/04; F01D 5/18; F01D 5/186
See application file for complete search history.

(56) References Cited

U.S. PATENT DOCUMENTS 3,394,918 A     7/1968   Wiseman
4,864,706 A *   9/1989   Jenkel ................... F01D 5/3061
                                                  228/160

(Continued)

FOREIGN PATENT DOCUMENTS

EP     3047103 A1    7/2016
EP     3498973 A1    6/2019
(Continued)

OTHER PUBLICATIONS

European Office Action dated May 2, 2022 for European Patent Application No. 21157233.4.
(Continued)

*Primary Examiner* — Matthew P Travers
(74) *Attorney, Agent, or Firm* — Bachman & LaPointe, P.C.

(57) ABSTRACT

In a method for manufacturing a turbine engine element such as a blade or vane, the element has an airfoil. The method includes: applying a load across an assembly of a first cast portion of the airfoil and a second cast portion of the airfoil; and applying current across a junction of the first cast portion and the second cast portion to fuse the second cast portion to the first cast portion.

19 Claims, 8 Drawing Sheets

(51) Int. Cl.
    *B22D 21/00*     (2006.01)
    *B23K 9/095*     (2006.01)
    *B23K 11/00*     (2006.01)
    *B23K 11/02*     (2006.01)
    *B23K 13/01*     (2006.01)
    *B23K 101/00*     (2006.01)
    *B23P 15/04*     (2006.01)
    *F01D 5/28*     (2006.01)

(52) U.S. Cl.
    CPC ............ *B23K 11/02* (2013.01); *B23K 13/015* (2013.01); *B23P 15/04* (2013.01); *F01D 5/28* (2013.01); *B23K 9/0956* (2013.01); *B23K 2101/001* (2018.08); *F05D 2230/211* (2013.01); *F05D 2230/232* (2013.01)

(56) References Cited

U.S. PATENT DOCUMENTS

| | | | |
|---|---|---|---|
| 5,395,699 A | 3/1995 | Ernst et al. | |
| 5,814,783 A * | 9/1998 | Harville | B23K 11/252 219/112 |
| 6,033,619 A * | 3/2000 | Hattori | B28B 1/002 264/645 |
| 6,387,242 B1 | 5/2002 | Wei et al. | |
| 6,515,250 B2 * | 2/2003 | Miyasaka | B23K 11/02 228/193 |
| 8,267,663 B2 | 9/2012 | Larose et al. | |
| 9,656,321 B2 | 5/2017 | Cui et al. | |
| 9,687,910 B2 | 6/2017 | Bullied et al. | |
| 9,802,248 B2 | 10/2017 | Marcin, Jr. et al. | |
| 10,005,125 B2 | 6/2018 | Shah et al. | |
| 10,035,185 B2 | 7/2018 | Shah et al. | |
| 10,065,239 B2 | 9/2018 | Marcin, Jr. et al. | |
| 10,287,896 B2 | 5/2019 | Marcin, Jr. et al. | |
| 10,449,605 B2 | 10/2019 | Bullied et al. | |
| 2003/0143074 A1 | 7/2003 | Tsukamoto et al. | |
| 2009/0214335 A1 * | 8/2009 | Long | F01D 9/00 29/889.1 |
| 2009/0269193 A1 | 10/2009 | Larose et al. | |
| 2010/0135812 A1 | 6/2010 | Cairo et al. | |
| 2011/0005075 A1 * | 1/2011 | Trewiler | B23K 11/3081 29/889.1 |
| 2014/0294652 A1 | 10/2014 | Morrison et al. | |
| 2016/0151852 A1 * | 6/2016 | Särkiniemi | B23K 9/0956 219/130.51 |
| 2016/0222801 A1 * | 8/2016 | Marcin | F01D 5/28 |
| 2019/0039133 A1 | 2/2019 | Cui et al. | |
| 2019/0048727 A1 * | 2/2019 | Roberge | F01D 5/147 |
| 2019/0292920 A1 * | 9/2019 | Shah | F01D 5/188 |

FOREIGN PATENT DOCUMENTS

| | | | |
|---|---|---|---|
| WO | 2015041775 A1 | 3/2015 | |
| WO | 2015047698 A1 | 4/2015 | |
| WO | WO-2020039165 A1 * | 2/2020 | ......... B23K 11/0006 |

OTHER PUBLICATIONS

Brochure: "International Workshop on Field Assisted Sintering Technology", Jun. 2017, The Pennsylvania State University, University Park, Pennsylvania.

European Search Report dated Jul. 6, 2021 for European Patent Application No. 21157233.4.

European Office action dated Dec. 15, 2022 for EP Patent Application No. 21157233.4.

European Office Action dated Jul. 28, 2023 for European Patent Application No. 21157233.4.

* cited by examiner

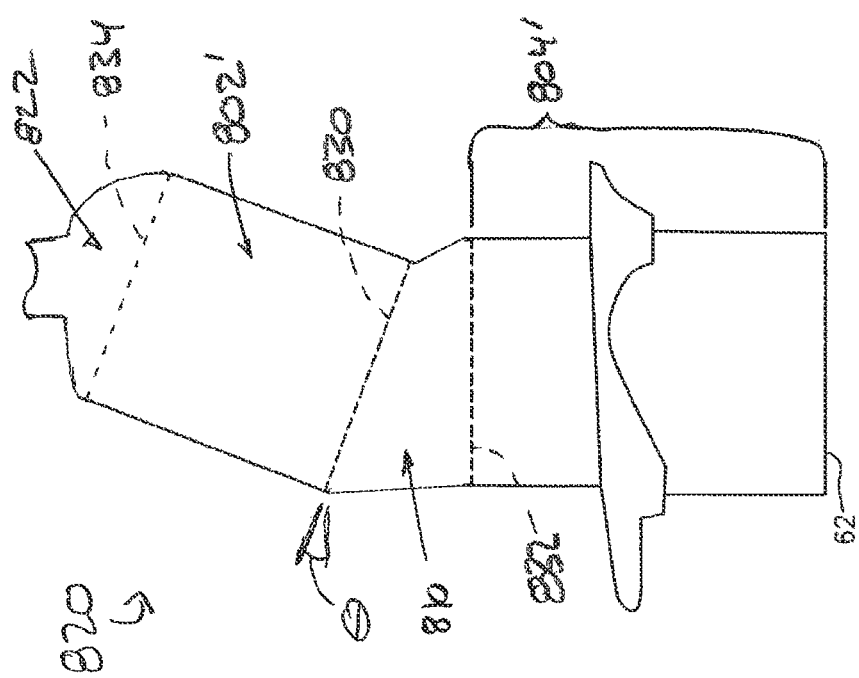

MULTI-ZONE BLADE FABRICATION

CROSS-REFERENCE TO RELATED APPLICATION

Benefit is claimed of U.S. Patent Application No. 62/976,561, filed Feb. 14, 2020, and entitled "Multi-Zone Blade Fabrication", the disclosure of which is incorporated by reference herein in its entirety as if set forth at length.

BACKGROUND

The disclosure relates to gas turbine engine blade manufacture. More particularly, the disclosure relates to multi-material vanes.

Gas turbine engines (used in propulsion and power applications and broadly inclusive of turbojets, turboprops, turbofans, turboshafts, industrial gas turbines, and the like) include blades and vanes (collectively airfoil members).

Particularly in higher temperature sections such as high pressure compressor section and turbine sections, multi-material blades have been proposed. Examples include bi- and tri-cast blades and blades formed of separately manufactured sections welded or otherwise bonded to each other.

Bi- and tri-casting methods are disclosed in: U.S. Pat. No. 9,687,910 (the '910 patent), Bullied et al., Jun. 27, 2017, "Multi-shot casting"; U.S. Pat. No. 10,035,185 (the '185 patent), Shah et al. Jul. 31, 2018, "Hybrid turbine blade for improved engine performance or architecture"; and U.S. Pat. No. 10,449,605 (the '605 patent), Bullied et al., Oct. 22, 2019, "Method and apparatus for manufacturing a multi-alloy cast structure". The disclosures of the '910 patent, '185 patent, and '605 patent are incorporated by reference in their entireties herein as if set forth at length.

Bonding is disclosed in U.S. Pat. No. 10,287,896 (the '896 patent), Marcin, Jr. et al., May 14, 2019, "Turbine blades and manufacture methods". The disclosure of the '896 patent is incorporated by reference in its entirety herein as if set forth at length.

Also, various powder metallurgy manufacture techniques have been developed for other components. United States Patent Application Publication No. 2014/0294652A1, Morrison et al., Oct. 2, 2014, discloses direct metal fabrication of component greenbodies followed by assembly and sintering. A recent technology in sintering of powder-formed bodies is field assisted sintering technology (FAST), also known as spark plasma sintering. This involves a combination of heat, pressure, and current.

SUMMARY

One aspect of the disclosure involves a method for manufacturing a turbine engine element (e.g., blade or vane). The element has an airfoil. The method comprises: casting a first cast portion of the airfoil and a second cast portion of the airfoil; assembling the first cast portion and second cast portion to each other; applying a load across the assembly of the first cast portion of the airfoil and the second cast portion of the airfoil; and applying current across a junction of the first cast portion and the second cast portion to fuse the second cast portion to the first cast portion.

A further embodiment of any of the foregoing embodiments may additionally and/or alternatively include heating the first cast portion of the airfoil and the second cast portion of the airfoil.

A further embodiment of any of the foregoing embodiments may additionally and/or alternatively include the element being a blade having an attachment root and the second cast portion being rootward of the first cast portion.

A further embodiment of any of the foregoing embodiments may additionally and/or alternatively include the first cast portion forming at least 20% of a span of the airfoil; and the second cast portion forms at least 20% of the span of the airfoil.

A further embodiment of any of the foregoing embodiments may additionally and/or alternatively include the second cast portion forming a portion of the airfoil and at least a portion of the attachment root.

A further embodiment of any of the foregoing embodiments may additionally and/or alternatively include the first cast portion and the second cast portion being of different alloys.

A further embodiment of any of the foregoing embodiments may additionally and/or alternatively include the first cast portion and the second cast portion being of different nickel-based alloys.

A further embodiment of any of the foregoing embodiments may additionally and/or alternatively include the first cast portion and the second cast portion being of single crystal structure.

A further embodiment of any of the foregoing embodiments may additionally and/or alternatively include the applying of the load and the applying of the current being simultaneous.

A further embodiment of any of the foregoing embodiments may additionally and/or alternatively include supplemental heating via induction heating.

A further embodiment of any of the foregoing embodiments may additionally and/or alternatively include the applying of the current comprising: applying pulsed DC power; and varying the pulsed DC power via temperature feedback control.

A further embodiment of any of the foregoing embodiments may additionally and/or alternatively include the applying of the current comprising varying the current via temperature feedback control.

A further embodiment of any of the foregoing embodiments may additionally and/or alternatively include the applying of the load comprising: applying load via a hydraulic powered ram; and feedback control of the applied load via a load cell.

A further embodiment of any of the foregoing embodiments may additionally and/or alternatively include the casting comprising: casting a precursor; and cutting the first cast portion and the second cast portion or precursors thereof from the cast precursor.

A further embodiment of any of the foregoing embodiments may additionally and/or alternatively include the casting of the precursor comprises leaving: a first alloy in a region for forming the first portion; a second alloy in a region for forming the second portion; and a transition region between the first alloy and the second alloy. The cutting at least partially removes the transition region.

A further embodiment of any of the foregoing embodiments may additionally and/or alternatively include the casting forms the precursor as a single crystal form.

A further embodiment of any of the foregoing embodiments may additionally and/or alternatively include machining cooling channels into cut surfaces of the first cut portion and second cut portion.

Another aspect of the disclosure involves a method for manufacturing a component: The method comprises: casting a component precursor having a region of a first alloy, a region of a second alloy, and a transition region in between;

cutting the precursor into a first piece, comprising the first alloy, a second piece comprising the second alloy, and a transition piece comprising the transition region; and fusing the first piece to the second piece.

A further embodiment of any of the foregoing embodiments may additionally and/or alternatively include grinding cut surfaces of the first piece and second piece.

A further embodiment of any of the foregoing embodiments may additionally and/or alternatively include the fusing comprising applying pressure and current.

Another aspect of the disclosure involves a method for manufacturing a turbine engine blade, the blade having an attachment root and an airfoil. The method comprises: applying a load across an assembly of a cast first piece of the blade and a second piece of the blade; and applying current across a junction of the cast first piece and the second piece to fuse the second piece to the cast first piece.

A further embodiment of any of the foregoing embodiments may additionally and/or alternatively include the second piece being a non-cast piece (e.g., a machined forging).

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 9 is a view of a precursor of a third alternate blade.

Like reference numbers and designations in the various drawings indicate like elements.

DETAILED DESCRIPTION

Figure 1:
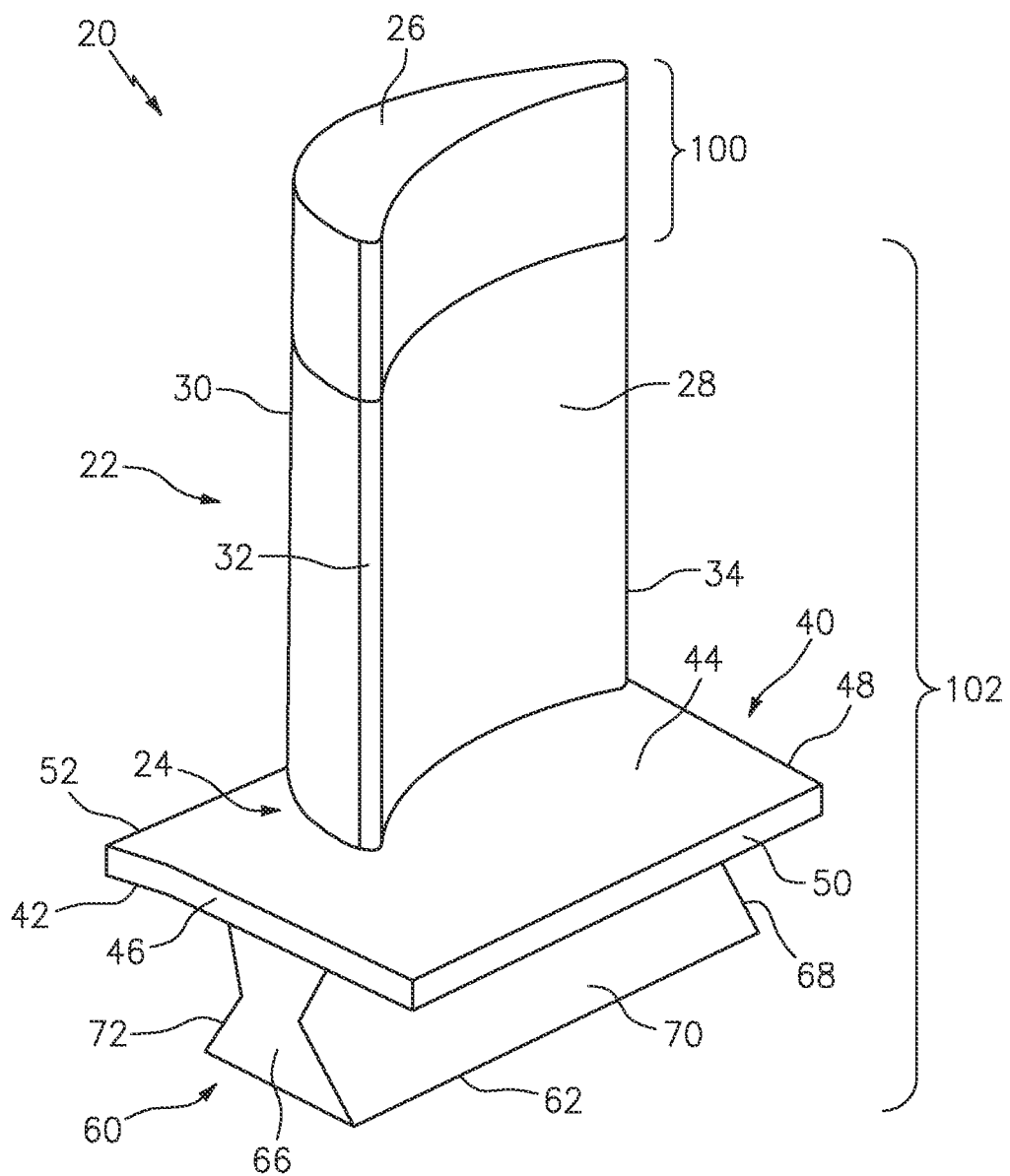
FIG. 1 is a view of a blade.

FIG. 1 shows a blade 20. The exemplary blade is used in a compressor or turbine section of a gas turbine engine. The blade has an airfoil 22 extending from an inboard (inner diameter (ID)) end 24 to an outboard (outer diameter (OD)) end 26. In the exemplary blade, the outboard end forms a free tip which may include features such as a squealer pocket, cooling outlets, and the like. Alternative blades may include shrouded tips. The airfoil includes respective pressure 28 and suction 30 sides extending between a leading edge 32 and a trailing edge 34.

At the inboard end 24 of the airfoil, the blade includes a platform 40 having an inboard face (underside) 42, an outboard face (gas path face) 44, a leading/forward end 46, a trailing/aft end 48, and lateral/circumferential ends 50, 52.

An attachment feature 60 depends from the underside 42 of the platform 40 (or from the airfoil inboard end if no platform). The exemplary attachment feature is dovetail or firtree root having an inboard end 62, an outboard end 64 at the platform underside 42, a forward end 66, an aft end 68, and lateral faces (sides) 70, 72. The lateral sides have the parallel convolution form providing the dovetail or firtree to be received in a complementary disk slot.

An optional internal cooling passageway system (not shown) includes one or more outlets along the root inboard end with passageways extending to one or more inlets along the airfoil (typically including trailing edge outlets, leading edge outlets, surface outlets along the pressure and/or suction side, and tip outlets).

The exemplary blade is formed having two basic zones 100, 102 of different materials. In an exemplary embodiment, the first zone 100 is formed of a first nickel-based superalloy having a first crystalline structure having associated crystalline axes 550, 552, 554. The second zone 102 is essentially formed of a second alloy having a second crystalline structure and second set of crystalline axes 550', 552', 554'. The two zones differ in at least one of said composition, crystalline structure (type), and crystalline axes orientation. In an initial example discussed below, the difference is in composition with the crystalline structures being the same (e.g., a particular single crystal (SX) structure or particular other directionally solidified (DS) structure) and orientation (i.e., each crystalline axis of the two zones is parallel to the corresponding axis of the other zone).

The two zones are joined at a junction/joint 104. The joining may be done by any of a number of techniques including welding and diffusion bonding. A particular technique is based on field assisted sintering technology (FAST) used to consolidate powder metallurgical articles. As is discussed further below, at one or both sides of the junction 104, there may be a transitional compositional gradient between a primary alloy of that zone 100, 102 and a primary alloy of the other zone 102, 100.

Figure 3:
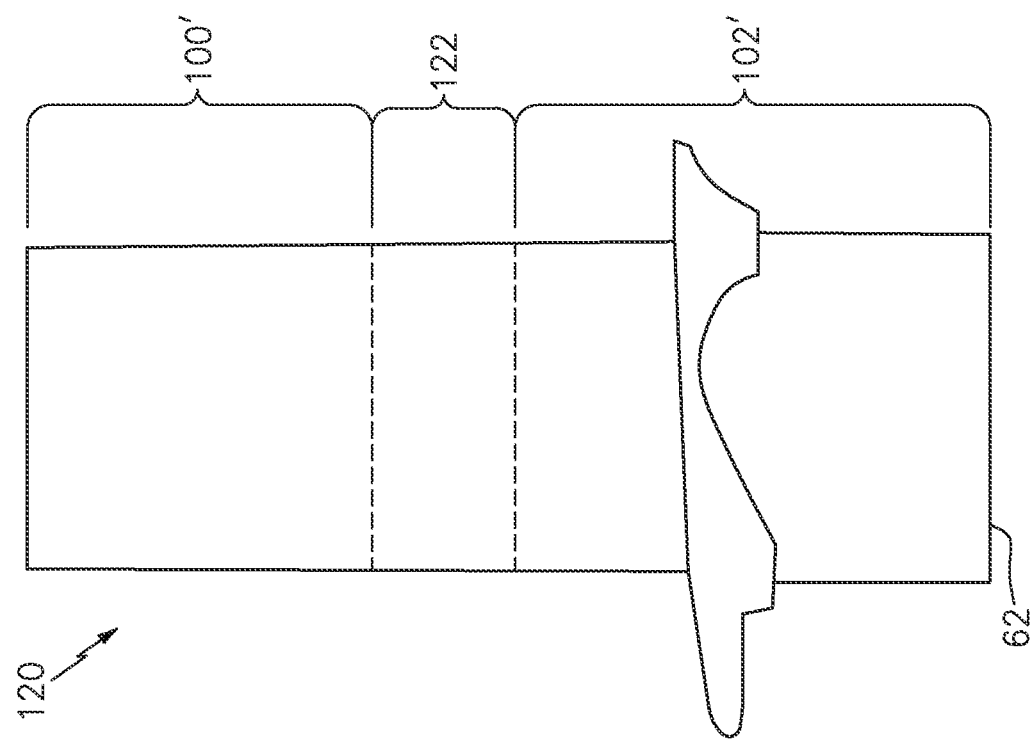
FIG. 3 is a view of a precursor of the blade.

FIG. 3 shows a cast precursor 120 of the blade 20. The precursor has zones 100' and 102' which ultimately form the zones 100 and 102. However, there is a further transition zone 122 therebetween. The exemplary precursor 120 is shown after an exemplary deshelling, decoring (if any), and removal (e.g., cutting away) of artifacts such as grain selector, gating, and the like. As is discussed further below, in the exemplary casting process, the blade is cast in a tip-downward orientation. This orientation is referenced even though the isolated blade views are, per convention, shown tip-upward on the drawing sheets.

Figure 4:
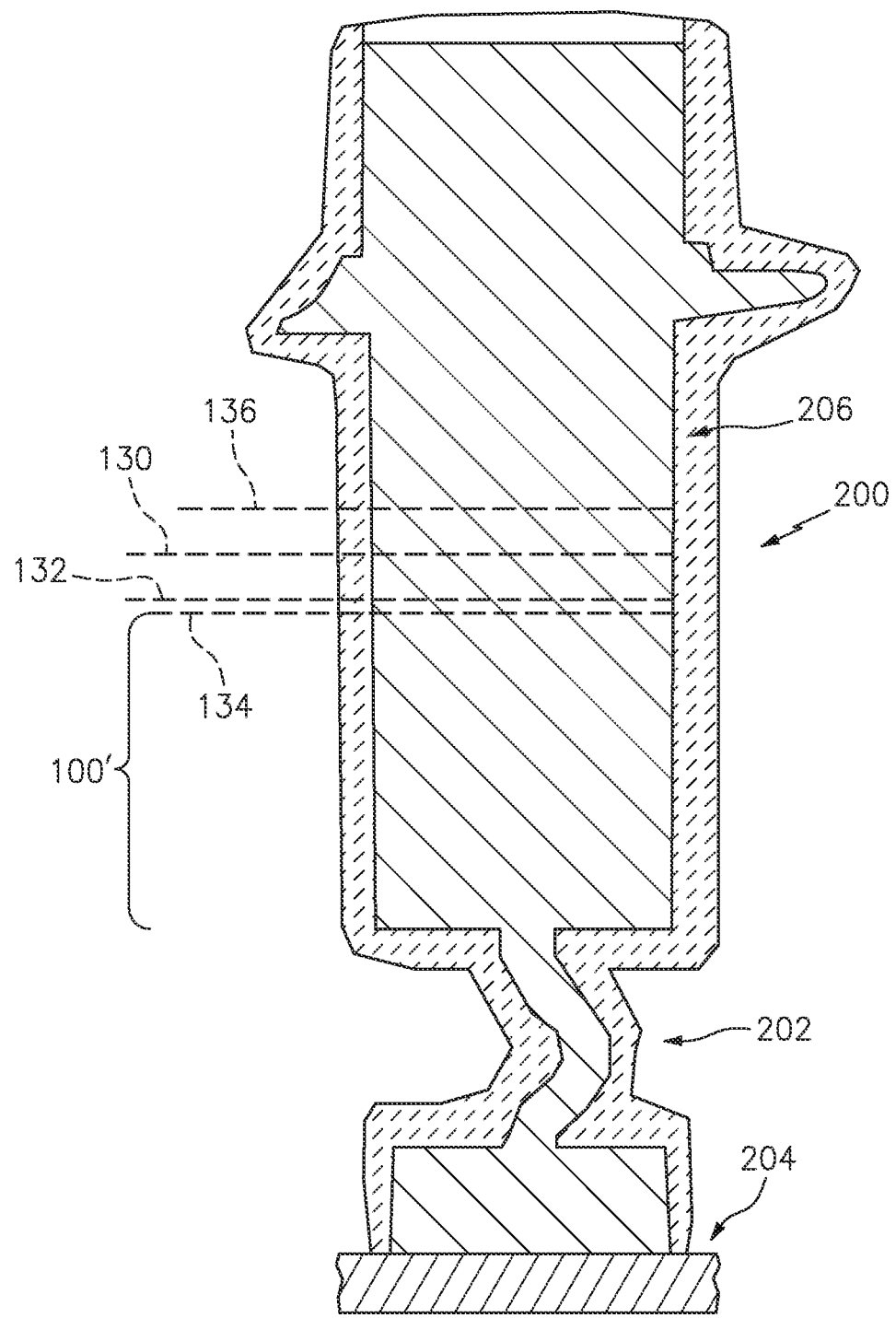
FIG. 4 is a partial schematic view of the blade precursor being cast.

FIG. 4 shows a portion of a shell 200 having a lower grain selector section 202 atop a chill plate 204 in a casting furnace (not shown). The shell has a mold section 206 above the grain selector forming a cavity as a negative of the part to be cast. An exemplary casting process is a top-feed first pour followed by a top-feed second pour of a different alloy. Several examples of such multi-alloy casting apparatus and methods are discussed above among other examples. As noted above, the blade may be cast with a cooling passageway system such as via a sacrificial core or core assembly (not shown—e.g., ceramic and/or refractory metal).

In the exemplary casting process, the primary alloy of the first zone (first alloy) 100' is poured (e.g., from a first crucible—not shown) to an exemplary level 130 (FIG. 4) above the zone 100' boundary/end. The alloy (being progressively withdrawn from a furnace) is allowed to solidify to a level 132 which may be close to the ultimate boundary/end 134 of the zone 100'. Then, the second zone primary alloy (second alloy) is poured (e.g., from a second crucible—not shown) and mixes with unmelted first alloy to begin to form the transition zone 122 with a transitional composition between the first alloy and the second alloy. With further withdrawal, the transition zone solidifies, eventually leaving the third zone 102' as essentially the second alloy. FIG. 4 shows an exemplary boundary 136 wherein the poured alloy has reached a commercial threshold of substantially pure second primary alloy. During this process, a single crystalline structure has propagated through the entire cast article (e.g., from a grain selector 202 or a seed (not shown).

After solidification, (e.g., after the deshelling (e.g., mechanical breaking), decoring (e.g., acid and/or alkali leaching and/or thermos-oxidative removal), degating (e.g., grinding or electrodischarge machining (EDM)), and the like noted above) the transition zone 122 may be fully or partially cut away (e.g., via electrodischarge machining (EDM)). This leaves respective first and second pieces corresponding to the zones 100, 102 which may then be joined.

Cutting away the entire transition zone 122 leaves an abrupt compositional change which may present issues of differential thermal expansion of the ultimate cast blade. Accordingly, in one example, the cuts are made to remove the transition piece so that the upper end of the first piece has a small amount of the second alloy (e.g., 10%) and the lower end of the second piece has a small amount of the first alloy (e.g., also 10%). Thus, there is a less abrupt change. In other variations, the first pour may be allowed to fully solidify before the second pour with the initial contact from the second pour causing meltback to, in turn, produce the transition zone 122 to subsequently be fully or partially removed.

Figure 2:
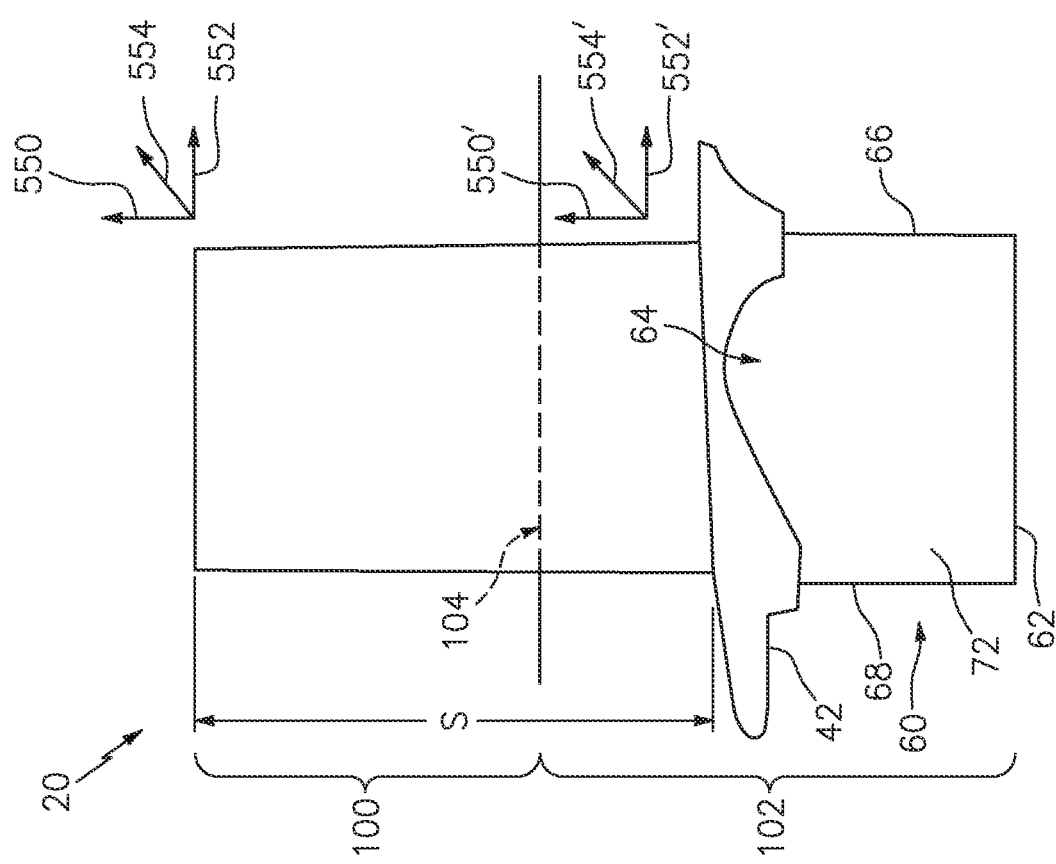
FIG. 2 is a second view of the blade.

FIG. 2 shows the airfoil having a span S. In exemplary embodiments, the junction 104 may fall within the span so that each of the two pours and its primary alloy forms some portion of the airfoil. In the exemplary embodiments, each such pour may account for at least 20% of the airfoil or at least 30% (e.g., 20%-80%).

Figure 5:
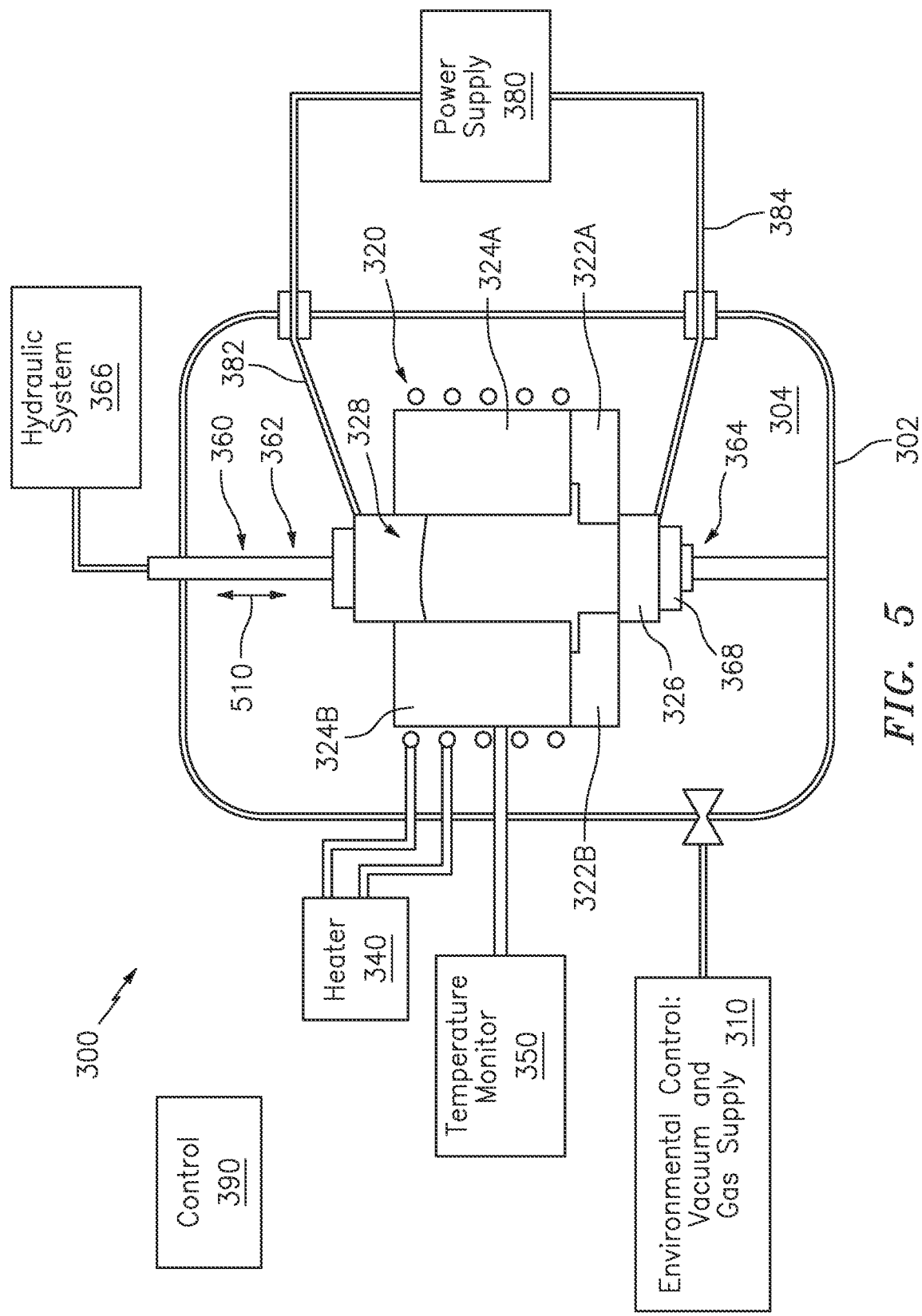
FIG. 5 is a schematic view of an apparatus for joining pieces of the blade.

FIG. 5 shows an apparatus/system 300 for joining the two pieces. The apparatus uses a combination of pressure, applied heat, and applied electrical current. The heat may result solely from the applied electrical current or may further arise from an external heat source (applied simultaneously with or before the current). The apparatus 300 includes a controller 390 for monitoring and controlling various apparatus subsystems. The controller may receive user inputs from an input device (not shown, e.g., switches, keyboard, or the like) and sensors (not shown, e.g., pressure sensors and temperature sensors at various system locations). The controller may be coupled to the sensors and controllable system components (via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

The apparatus 300 includes a vacuum chamber 302 having an interior 304. A vacuum source and gas supply system 310 is connected to the chamber via valving. An exemplary system 310 includes one or more stages of vacuum pumps (not shown) and gas cylinders (not shown—e.g., inert gas such as Ar, He, and/or $N_2$ for preventing chemical reaction (e.g. oxidation) of the mating surfaces). Additional pressure sensors (not shown) and other features common to FAST systems are not shown and may be coupled to the controller 390.

To hold the pieces being assembled, the apparatus 300 includes a multi-piece fixture or die 320. Exemplary die pieces are graphite or graphite inserts forming the workpiece-receiving cavity in metallic supports. The die pieces may be assembled over the blade pieces. One or more of the die pieces may be movable relative to one or more others. In the basic illustrated embodiment, the body has several main pieces 322A, 324A, 322B, 324B laterally encircling the blade. These pieces may comprise metallic substrates and may be assembled to each other via bolting or insertion in a frame (not shown). Additional die pieces 326 and 328 engage the root base and airfoil tip. The exemplary piece 328 is slidably mounted in the assembled pieces 324A, 324B for movement parallel to a direction 510.

For applying heat, the apparatus includes an optional heat source 340 such as an induction heater. A temperature monitor 350 (e.g., having one or more sensors such as an optical pyrometer or a thermocouple array) may measure die temperature to provide a proxy workpiece temperature.

For applying pressure, the apparatus includes an actuator 360 such as a hydraulic actuator. The exemplary hydraulic actuator is a hydraulic ram system 360 including one or more rams 362, 364 engaging associated elements of the die. A hydraulic source 366 under control of the controller 390 may drive the ram(s) along the direction 510. The pressure applied by the ram may be measured by a load or pressure sensor 368 (e.g., a strain gage-type load cell in line with the loading axis).

For applying current, the apparatus includes a current source 380 (e.g., a DC power supply or AC power supply). For most applications relating to blades and similarly sized articles, the current source will have a peak current output of 5.0 kA to 50 kA (with peak output largely dependent on the contact area at the junction). Conductors/leads 382, 384 (e.g., passing through insulated ports in the chamber) connect to associated conductive die pieces to, in turn, have electrical contact with respective portions of the two pieces. Remaining die pieces which may span the two cast pieces may be electrically insulating or have an electrically insulating coating along the cavity they form so that the applied current flows through the piece-to-piece junction of the blade rather than bypassing the blade through the die.

The controller 390 controls the hydraulic system to maintain a desired contact pressure along the junction between pieces. For example, the controller may be programmed with geometric parameters of the blade including the area of contact between pieces. The controller also controls the current source to apply current. The contact pressure and current (and any supplemental heating are effective to achieve bonding in the solid state with the temperature not exceeding the melt point of the alloy(s) and not adversely deforming the blade or nucleating stray grain/recrystallization in the case of single crystal components. To avoid melting, the controller may be programmed with the alloy melt points and may monitor temperature via the temperature monitor 350.

In an exemplary procedure, after casting, deshelling, decoring, and cutting, a user may further prepare the workpieces to be joined taking care to achieve good alignment and mating at the interface. For example, at the cut surfaces, a recast layer may be removed. Exemplary removal is an abrasive grinding (e.g., via abrasive medium such as abrasive paper) followed by slurry polishing with progressively finer suspension (e.g., diamond progressing down to one micrometer).

Separately, in the engineering process, via modeling and/or via prior experimentation (conducting tests and nondestructively and destructively examining the results), user(s) may have defined the temperature and load limits of each workpiece combination and a target time at load/temperature. For the bonding of single crystal castings, the process should be performed in the solid state. Thus the temperature should remain below any level for which melting may occur. Such a temperature limit may be the incipient melt point of the alloy as opposed to the bulk melting temperature. To maintain the single crystal nature of each workpiece the load should be below that which causes any of the following: stray grain nucleation; recrystallization; and/or substantial adverse plastic deformation. In addition to the particular properties of the material(s) and the gross geometry at the junction, surface finish and precision may be a factor. For example, a finer/smoother finish of the faces to be mated may allow lower loads/pressures for bonding.

Such user(s) may program the controller 390 with the temperature and load limits defined. Depending on the precision of the temperature and load sensors the user(s) may program the controller with a factor of safety (e.g., measured temperature limit a given delta such as 15.0° F. (8.3° K) below the initially defined theoretical temperature limit).

As a non-limiting example, in a successful bonding of single crystal Ni-superalloy (Ni bal., weight percent 5.0 Cr, 10.1 Co, 1.9 Mo, 5.7 Al, 8.7 Ti, 5.9 W, 3.0 Re, plus impurities) pieces, the current was controlled to limit temperature to 2,300° F. (1278° C.) and the applied load was targeted at 7.0 ksi (48 MPa).

In an exemplary further sequence, the user assembles the pieces into the die and couples the ram to the die. Then, the controller may operate the pump to evacuate the chamber and the gas supply to backfill with inert gas. The controller then causes the hydraulic system to apply the target load and applies a target current while monitoring temperature. When/if temperature reaches or approaches the threshold, the controller may modulate the applied current (e.g., duty cycle modulation) to maintain the temperature within the threshold (e.g., a range up to the threshold) for the target time. Upon reaching the target time, the controller may terminate current application, release the load, let the system cool down, and then vent the chamber to permit extraction of the fused workpiece.

Further variations include more complex arrangements of the precursor and forms of its associated mold. For example, if it is desired to have a shift in the crystalline axes, the form of the mold may include a twist and/or kink in the area that forms the transition zone so that, when cutaway, and the pieces reoriented to reassemble a continuous airfoil, the respective axes of the two zones are out of registry by the desired amount. Such a twist, kink, and/or other discontinuity may even be used in the casting of a single alloy composition with a single pour.

Figure 7:
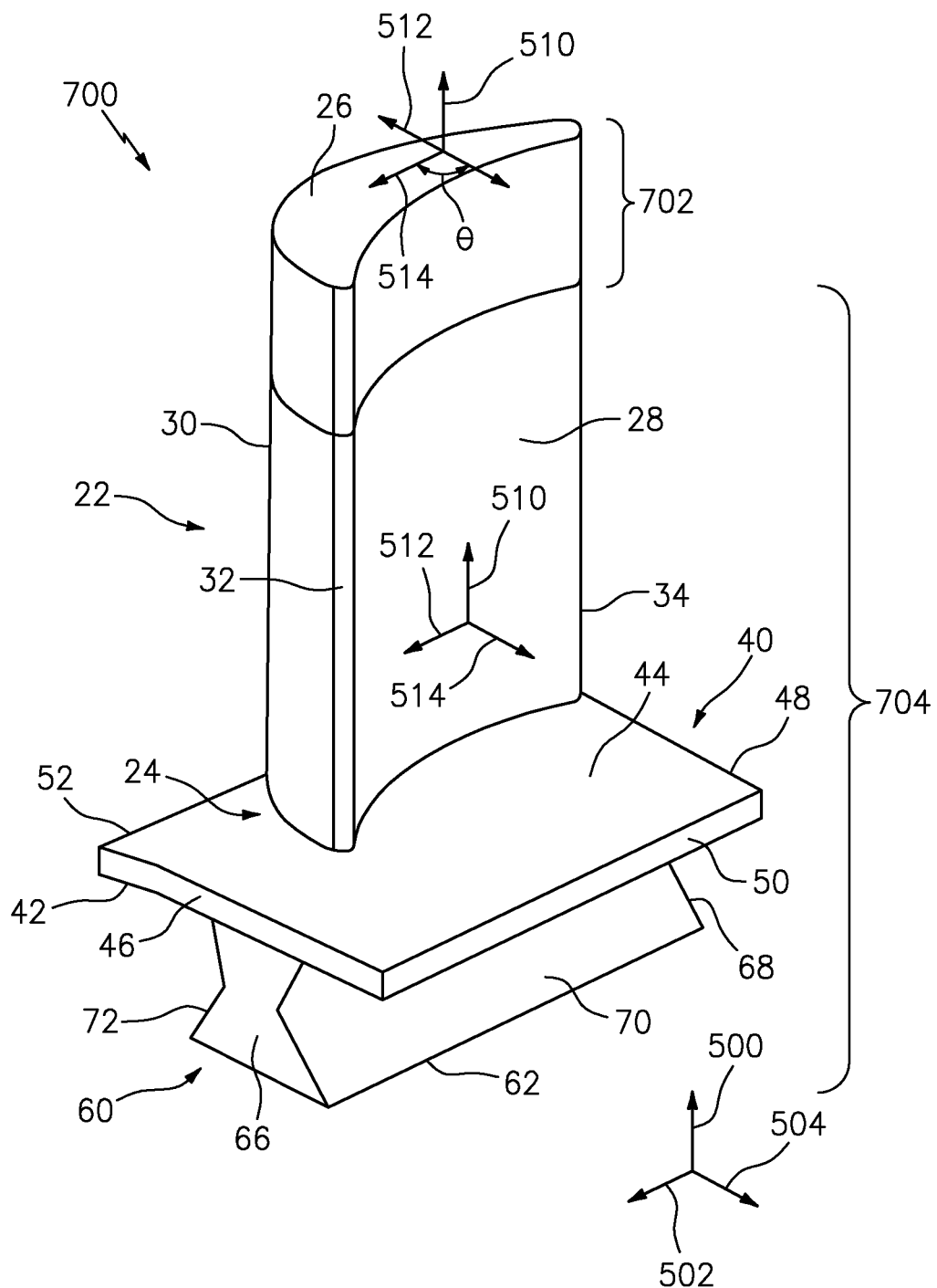
FIG. 7 is a view of a second alternate blade.
Figure 8:
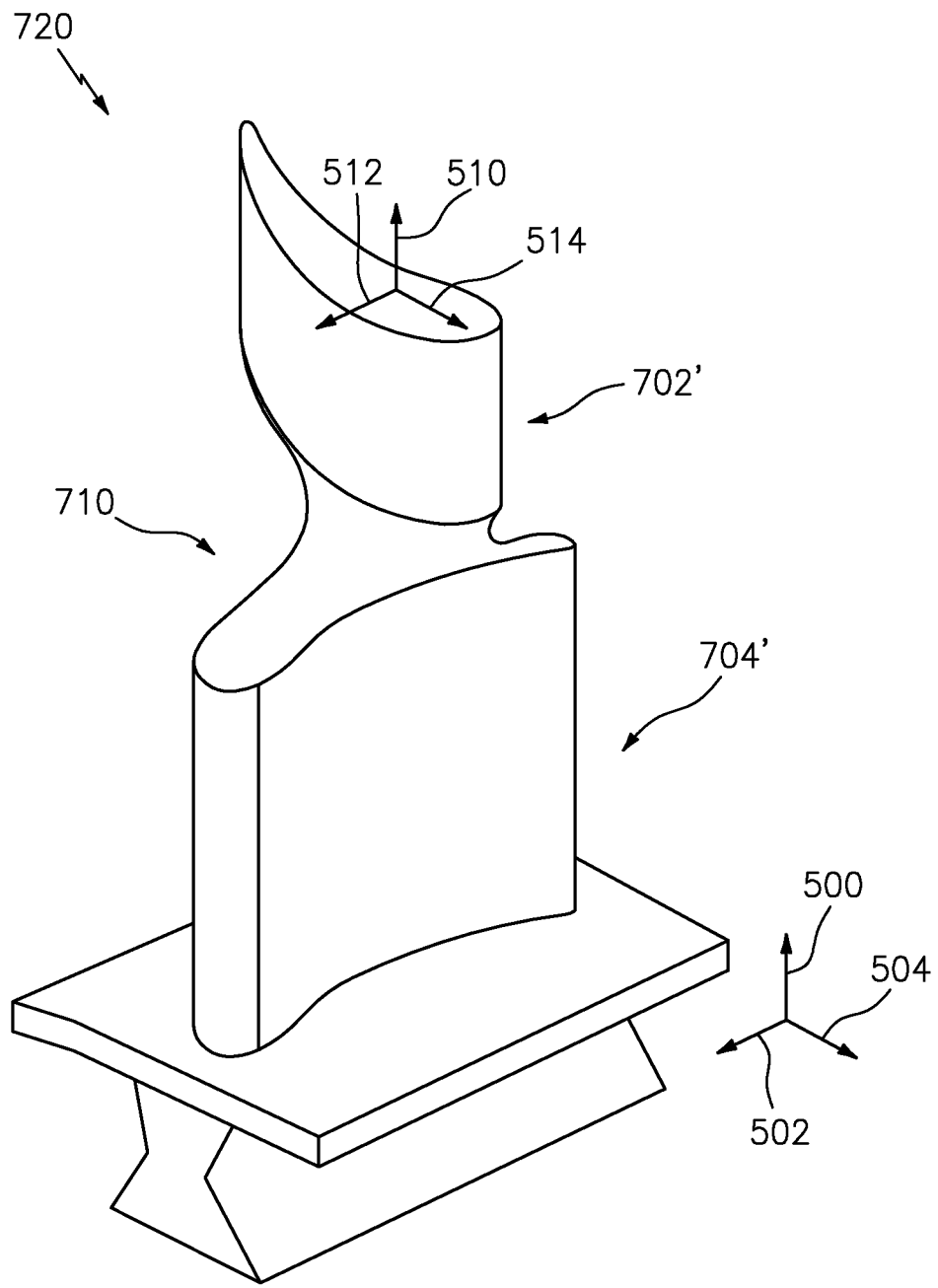
FIG. 8 is a view of a precursor of the second alternate blade.

An example of an intentional out of registry situation is shown in FIGS. 7 and 8. FIG. 7 shows one example of a blade 700 having zones 702 and 704 which may be generally similar in exterior features to the respective zones 100, 102 of the blade 20. Accordingly such features of the blade 700 are not separately numbered. A characteristic of the exemplary blade 700 is that blade zones 702 and 704 have crystalline axes out of registry with each other. FIG. 8 shows a precursor 720 (gating (not shown) having already been cut off) having the precursor 702' of zone 702 cast rotated relative to the FIG. 7 condition and the precursor 704' of zone 704 by an angle θ about a spanwise axis 500. The crystalline axes are labeled 510, 512, and 514. For purposes of illustration, the 510 axis is coincident with the spanwise axis in both zones. The transition region 710 (cut away after casting as with the first blade) geometrically accommodates the intended rotation. The transition region 710 may or may not also provide the compositional variation of the first blade.

When reassembled, the 510 axis is still coincident in both zones, but the 512 and 514 axes are relatively rotated by the angle θ about the axis 500. Thus, the exemplary transition region 710 appears as a twist. Alternative rotations may be about the longitudinal 502 axis or the circumferential 504 axis or some other axis. These may be associated with a kink in the cast precursor and with non-parallel cuts removing the transition region (FIG. 9 discussed below). If both a compositional gradient and the misregistry are present, then a particularly large transition area may be needed where pour boundaries/transitions are not parallel to at least one of the cuts. An example of the desired misregistry may be 0° to 90° or 20° to 90°. The axis rotation may be used to affect frequency response (e.g., so that a blade resonant frequency does not coincide with an excitation frequency at a key engine operating points).

FIG. 9 shows a precursor 820 (gating 822 partially cut away) having the precursor 802' of a tipward zone cast rotated relative to the precursor 804' of a rootward zone and ultimate reassembled condition by an angle θ about a non-spanwise axis. The illustrated configuration leaves the primary crystalline axis of the rootward section spanwise but rotates the primary crystalline axis of the tipward zone off-spanwise. Alternative implementations might rotate the rootward zone primary crystalline axis off spanwise.

FIG. 9 shows off-parallel cuts 830 and 832 for removing the transition region 810 to geometrically accommodate the intended rotation and 834 to remove gating from the tip.

Figure 6:
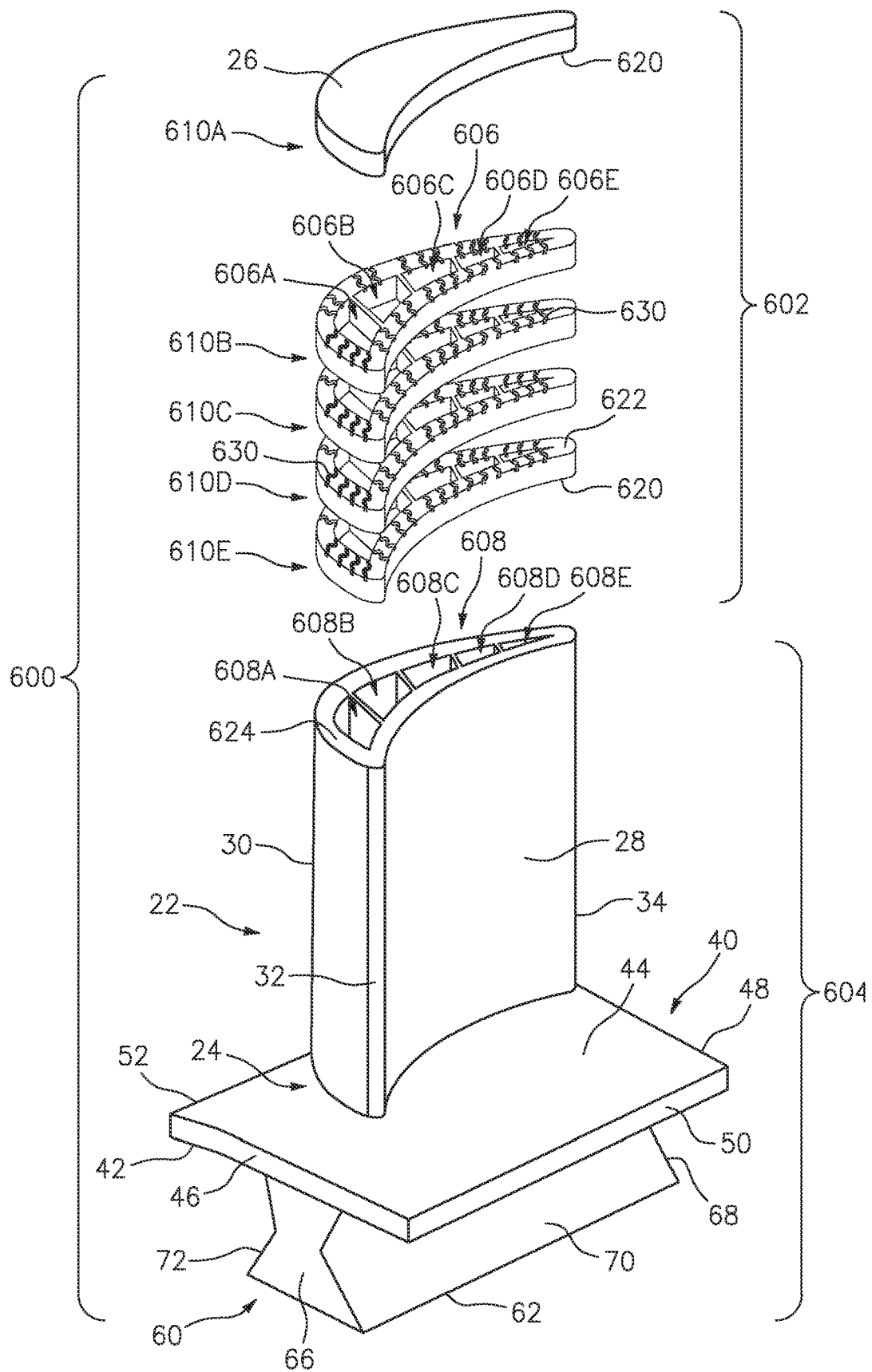
FIG. 6 is an exploded view of a first alternate blade.

Further variations may facilitate machining of internal passageways before joining the pieces. FIG. 6 shows one example of a blade 600 having zones 602 and 604 which may be generally similar in exterior features to the respective zones 100, 102 of the blade 20. Accordingly such features of the blade 600 are not separately numbered. A characteristic of the exemplary blade 600 is a cooling passageway system having portions differently formed in the two zones (e.g., having a cast portion 608 in the rootward zone 604 and a hybrid cast/machined portion 606 in the tipward zone 602). In the original casting process, a casting core casts the passageway portion 608. In the example, the rootward zone 604 is a single piece, whereas the tipward zone 602 is multiple pieces 610A, 610B, 610C, 610D, 610E. The piece 610A is a tip piece. The remaining pieces 610B, 610C, 610D, 610E are stacked between the tip piece and the rootward zone/piece 604. Each piece 610B, 610C, 610D, 610E has respective cut surfaces/faces 620, 622. The rootward piece has a cut surface/face 624.

In the example, the passageway portion 608 comprises a plurality of sections 608A, 608B, 608C, 608D, 608E open to the cut surface 624. Some of these may be trunks extending from inlets (not shown) along the root inboard end 62. The passageway portion 606 comprises a plurality of sections 606A, 606B, 606C, 606D, 606E. Each of the sections of the rootward portion passageway may register with an associated one of the sections of the tipward portion passageway.

The cooling passageway system has outlet passageways 630 formed by machining along the cut surfaces.

After decoring, the pieces are cut from the decored casting. Before the joining at the cut surfaces, the outlet passageways 630 may be machined. Exemplary machining is milling or plunge EDM through the associated cut surface. If a single alloy is used, only one cut may be needed to provide each subsequent joint/junction. For dual alloy blades, two cuts to remove a transition zone may be desired and so forth.

Various implementations may be formed of more than two pieces and more than two primary alloys. Examples of alloy combinations include those in the '896 patent, '910 patent, '185 patent, and '605 patent. In further mass production embodiments, the first and second pieces of a given assembly may come from two distinct castings (e.g., the second piece of one casting is assembled to the first piece of another). In other embodiments, the pieces may be separately cast rather than cut from a combined casting.

Further variations may include non-cast pieces. For example, a polycrystalline root section machined from a forged billet may be bonded via the modified FAST process and apparatus to a single-crystal cast airfoil (either a single piece or multiple pieces such as in the examples discussed above). In one example, the platform is a part of the casting. If multiple cast pieces are involved, the same application of current and pressure may fuse them to each other as fuses one or more to the non-cast piece.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for manufacturing a plurality of turbine engine elements, each element having an airfoil, the method comprising:
    casting a first cast portion of the airfoil of each element and a second cast portion of the airfoil of each element; and
    for each element:
        assembling the first cast portion and second cast portion to each other;
        applying a load across the assembly of the first cast portion and the second cast portion; and
        applying current across a junction of the first cast portion and the second cast portion to fuse the second cast portion to the first cast portion,
    wherein:
        the casting comprises:
            casting a plurality of precursors having cast passageways; and
            from each cast precursor, cutting the first cast portion and the second cast portion or precursors thereof from the cast precursor;
        the casting of each precursor leaves:
            a first alloy in a region for forming the first portion;
            a second alloy in a region for forming the second portion; and
            a transition region between the first alloy and the second alloy; and
        the cutting at least partially removes the transition region to leave at the junction at most 10% said second alloy in the first portion and 10% said first alloy in the second portion.

2. The method of claim 1 further comprising:
    supplemental heating of the first cast portion of the airfoil and the second cast portion of the airfoil.

3. The method of claim 1 wherein:
    the element is a blade having an attachment root; and
    the second cast portion is rootward of the first cast portion.

4. The method of claim 3 wherein:
    the first cast portion forms at least 20% of a span of the airfoil; and
    the second cast portion forms at least 20% of the span of the airfoil.

5. The method of claim 3 wherein:
    the second cast portion forms a portion of the airfoil and at least a portion of the attachment root.

6. The method of claim 1 wherein:
    the first cast portion and the second cast portion are of different alloys.

7. The method of claim 1 wherein:
    the first cast portion and the second cast portion are of different nickel-based alloys.

8. The method of claim 1 wherein:
    the first cast portion and the second cast portion are of single crystal structure.

9. The method of claim 1 wherein:
    the applying of the load and the applying of the current are simultaneous.

10. The method of claim 1 further comprising:
    supplemental heating via induction heating.

11. The method of claim 1 wherein the applying of the current comprises:
    applying pulsed DC power; and
    varying the pulsed DC power via temperature feedback control.

12. The method of claim 1 wherein the applying of the current comprises:
    varying the current via temperature feedback control.

13. The method of claim 1 wherein the applying of the load comprises:
    applying load via a hydraulic powered ram; and
    feedback control of the applied load via a load cell.

14. The method of claim 1 further comprising:
    machining cooling channels into cut surfaces of the first cast portion and second cast portion.

15. The method of claim 1 further comprising:
    machining cooling channels into cut surfaces of the first cast portion and second cast portion, wherein the machined cooling channels form outlet passageways from the cast passageways upon the fusing.

16. The method of claim 1 wherein:
    the cutting comprises a pair of spaced-apart cuts; and
    the pair of spaced-apart cuts entirely removes the transition region.

17. A method for manufacturing a plurality of turbine engine elements, each element having an airfoil, the method comprising:
    casting a first cast portion of the airfoil of each element and a second cast portion of the airfoil of each element; and
    for each element:
    assembling the first cast portion and second cast portion to each other;
    applying a load across the assembly of the first cast portion and the second cast portion; and
    applying current across a junction of the first cast portion and the second cast portion to fuse the second cast portion to the first cast portion, wherein:
the casting comprises:
casting a plurality of precursors; and
from each cast precursor, cutting the first cast portion and the second cast portion or precursors thereof from the cast precursor;
the cutting comprises a pair of spaced-apart cuts;
the pair of spaced-apart cuts are electrodischarge machined (EDM);
the pair of spaced-apart cuts remove a twist or a kink; and
the assembling assembles the first cast portion and second cast portion with corresponding crystalline axes 20° to 90° out of registry.

18. The method of claim 17 wherein:
the element is a blade having an attachment root; and
the second cast portion is rootward of the first cast portion.

19. A method for manufacturing a plurality of turbine engine elements, each element having an airfoil, the method comprising:
casting a first cast portion of the airfoil of each element and a second cast portion of the airfoil of each element; and
for each element:
assembling the first cast portion and second cast portion to each other;
applying a load across the assembly of the first cast portion and the second cast portion; and
applying current across a junction of the first cast portion and the second cast portion to fuse the second cast portion to the first cast portion,
wherein:
the casting comprises:
casting a plurality of precursors; and
from each cast precursor, cutting the first cast portion and the second cast portion or precursors thereof from the cast precursor;
the cutting comprises a pair of spaced-apart cuts;
the pair of spaced-apart cuts are electrodischarge machined (EDM);
the pair of spaced apart cuts are two of a plurality of spaced apart cuts;
the plurality of spaced apart cuts divide the first cast portion into a blade tip piece and a plurality of other pieces and the second portion as a rootward piece;
the method includes machining cooling channels into cut surfaces of the plurality of other pieces;
the fusing is of a stack of the tip piece, the plurality of other pieces, and the rootward piece; and
the machined cooling channels form outlet passageways from cast passageways upon the fusing.

* * * * *